United States Patent [19]

Johnson et al.

[11] 3,731,183

[45] May 1, 1973

[54] POWER CONTROL AND PHASE ANGLE CORRECTING APPARATUS

[75] Inventors: Arthur C. Johnson; Robert F. Herrman, both of Rancocas, N.J.

[73] Assignee: Inductotherm Corporation, Rancocas, N.J.

[22] Filed: Sept. 29, 1971

[21] Appl. No.: 184,851

[52] U.S. Cl. .................... 323/24, 307/104, 307/107, 307/108, 323/122, 323/128
[51] Int. Cl. ..................... H02p 13/16, H02m 5/22
[58] Field of Search ..................... 307/108, 109, 110, 307/252 B, 252 T, 104, 107; 323/24, 122, 128; 318/138

[56] References Cited

UNITED STATES PATENTS

| | | | |
|---|---|---|---|
| 2,279,229 | 4/1972 | Evans et al. | 323/128 |
| 3,400,326 | 9/1968 | Zhukov et al. | 323/128 |
| 3,530,370 | 9/1970 | Yamachi et al. | 307/108 X |
| 3,532,855 | 10/1970 | Van Cleave | 323/24 X |
| 3,611,017 | 10/1971 | Freeland | 323/24 X |
| 3,419,792 | 12/1968 | Kasper et al. | 323/128 X |

Primary Examiner—Gerald Goldberg
Attorney—Seidel, Gonda, & Goldhammer

[57] ABSTRACT

Apparatus for controlling power and for compensating for a low power factor due to a relatively large varying inductive load. A number of branches having an inverse parallel connected pair of thyristors and a capacitor connected in series are connected in parallel. These parallel branches are connected in series between an alternating current source and the load. At least one thyristor of one of the inverse parallel connected pairs of thyristors is gated on at some time during each half cycle of the alternating current supply voltage in order to control the power flow to the load. One thyristor of one or more of the inverse parallel pairs of thyristors is gated on at appropriate times during each half cycle in order to place one or more of the capacitors, which are in parallel with each other, in series between the source and the load.

7 Claims, 1 Drawing Figure

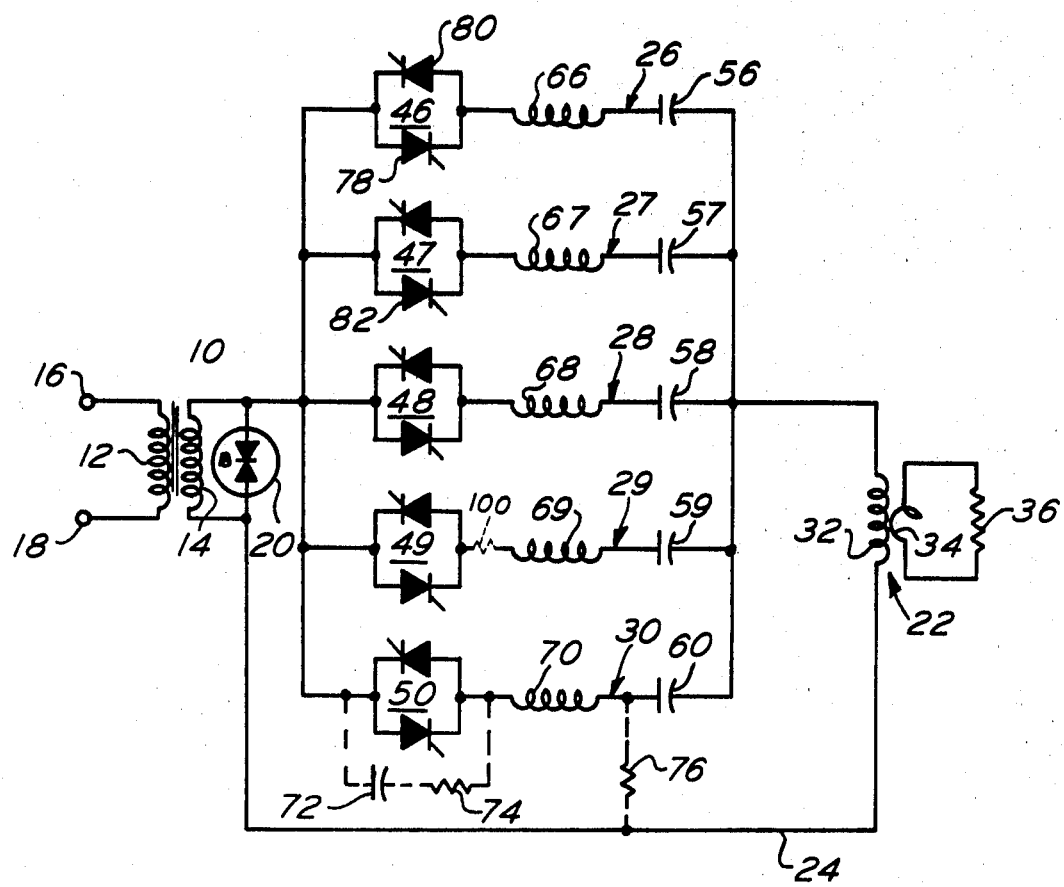

3,731,183

POWER CONTROL AND PHASE ANGLE CORRECTING APPARATUS

DISCLOSURE

This invention relates to power control and phase angle correcting apparatus. More particularly, this invention relates to a power control and phase angle correcting apparatus in which a number of capacitors connected in parallel and in series between the source and the load may be electrically switched in various combinations to provide power factor correction by thyristors which also control the power flow to the load.

The invention may be used to control the power and compensate for a low power factor of any inductive load. However, it may be particularly advantageously used to compensate for a low power factor of a load which varies with time. In particular, the invention may be advantageously used to control the power supplied to an induction furnace and to compensate for the low varying power factor of an induction furnace.

Heretofore, continuous control or stepless electronic controls have been known which utilize inverse parallel connected thyristors connected in series between the load and the alternating current supply. It has also been known in the prior art to connect the capacitor in series with an inverse parallel connected pair of thyristors across the line in parallel with the load in order to regulate the reactive power component. However, this prior art does not teach means for controlling real power supplied to the load.

It is an object of this invention to provide apparatus for continuously controlling the power supplied to the load by simultaneously controlling the phase angle between the voltage and the current of the power supplied to the load.

Another object of this invention is to provide selection of the proper amount of series capacitance necessary to achieve the desired operating power factor without mechanical switching.

A further object of this invention is to provide apparatus which may select the desired amount of series capacitance while maintaining harmonic distortion at a minimum.

A still further object of this invention is to provide series capacitance power factor correcting apparatus which may be initially energized with a minimum of transient line disturbance.

Briefly, the essence of this invention is a plurality of parallel connected branches connected in series between a source of alternating current potential and an inductive load. Each of the plurality of parallel connected branches comprises a series connected capacitor and an inverse parallel connected pair of thyristors. One thyristor of one or more of said inverse parallel connected pairs of thyristors is triggered during each half cycle of the alternating current source in various combinations and retarded in various degrees of phase in order to provide the proper amount of power to the load and to compensate for the low power factor of the load. Each of the plurality of branches may be provided with an inductance connected in series with the inverse parallel connected pair of thyristors and the capacitor in order to limit frequency of and damp out oscillations between the branches. Alternatively the oscillations may be damped by resistors connected in series with each branch. Means are also provided in parallel with each inverse parallel connected pair of thyristors in order to protect them from excessive voltages. Means may also be provided to discharge the series of capacitors upon deenergization of the system thereby preventing a hazard to personnel.

For the purpose of illustrating the invention, there is shown in the drawings a form which is presently preferred; it being understood, however, that this invention is not limited to the precise arrangements and instrumentalities shown. The drawing shows schematic diagram of apparatus in accordance with the present invention.

Referring now to the drawing in detail, there is shown a transformer 10 having a primary winding 12 and a secondary winding 14. A source of alternating current (not shown) may be connected across terminals 16 and 18 of primary winding 12 of transformer 10. A protective device 20, which may be any suitable type of bilateral breakdown device, is connected across secondary winding 14 of transformer 10.

Secondary winding 14 of transformer 10 may be connected to a load 22 through common line 24 and through one or more of a plurality of branches 26–30. The load 22 comprises a coil 32 which may be the coil of a coreless induction furnace. Inductance 34 and resistance 36 represent the loading effect on coil 32. The loading effect may vary with time depending upon the condition and amount of metal in the induction furnace.

Each of the parallel connected branches 26–30 may be comprised of an inverse parallel connected pair of thyristors 46–50 connected in series with capacitors 56–60, respectively. Each of the branches 26–30 may be provided with series connected inductances 66–70, respectively. The inductances 66–70 are desirable to damp inter-branch oscillations which may result as a consequence of variations in component values due to practical manufacturing tolerances. Alternatively the inductances 66–70 may be replaced by resistors to damp the inter-branch oscillations, or a resistor connected in series with each of the inductances 66–70 may be used. Such a series connected resistor is shown in dotted lines in branch 29 at 100. Each of the inverse parallel connected pairs of thyristors 46–50 may be provided with a series connected capacitor and resistor connected in parallel with the thyristors as shown in dotted lines for inverse parallel connected pair of thyristors 50 by capacitor 72 and resistor 74. Similarly, each of the capacitors 56–60 may be provided with a discharge means such as resistor 76 shown in dotted lines for capacitor 60 connected between branch 30 and a common point such as common line 24. Alternatively, resistor 76 could be connected in parallel with capacitor 60 in order to provide the discharge path.

Although five parallel connected branches 26–30 are shown in the specific embodiment described, it is understood that more or less than five branches may be used. Selection of the number of branches involves consideration of a practical trade off between an acceptable amount of harmonic distortion and economy. That is, by using five branches, the gating of a thyristor in a second branch increases the capacitance in series between the source and the load by a smaller increment than would be possible if only two branches were used.

In operation, an alternating current source is applied across terminals 16 and 18. During the positive half cycle, thyristor 78 of inverse parallel connected pair of thyristors 46 may be gated on at some time during the positive half cycle depending upon the amount of power required to be supplied to the load 22. In actual operation, it is desirable to initiate operation by triggering the thyristors of inverse parallel connected pair of thyristors 46 at a large retard angle in order to permit capacitor 56 to acquire its stored energy condition with a minimum of transient line disturbance. On a negative half cycle, thyristor 80 of inverse parallel connected pair of thyristors 46 would be fired at some value of retard angle depending upon the amount of power desired to be supplied to the load.

In order to compensate for the varying power factor, various numbers of the capacitors 56–60 may be connected into the line at various phase angles. For example, on a positive half cycle, it may be desirable to trigger thyrister 78 at 30° retard and thyristor 82 at 60° retard in order to provide the exact amount of compensating capacitance for the instantaneous value of the power factor of the load 22. Similarly, the thyristors of inverse parallel connected thyristor pairs 46–50 may be triggered in various combinations in order to provide the exact amount of compensating serious capacitance in order to compensate for the instantaneous power factor to load 22. The triggering means for triggering the thyristors of inverse parallel connected thyristor pairs 46–50 forms no part of this invention. However, this triggering means may be a closed loop feedback system well-known to the electronic arts which sense variations in the power required by the load and in its power factor, and in turn varies the retard angle of the trigger signals and the number of inverse parallel thyristor pairs receiving trigger signals.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for controlling the magnitude and the phase angle between voltage and current of electrical power supplied to an inductive load, comprising:
   a first point being adapted to be connected to a supply of alternating electrical potential;
   a second point being adapted to be connected to the inductive load;
   a plurality of branches connected in parallel between said first point and said second point, each of said plurality of branches being comprised of an inverse parallel connected pair of thyristors connected in series with a capacitor,
   one thyristor of one or more of said inverse parallel connected pairs of thyristors being triggered during each half cycle of the alternating electrical potential.

2. Apparatus according to claim 1 wherein each of said plurality of branches is provided with an inductance connected in series with the inverse parallel connected pair of thyristors and capacitor of each respective branch.

3. Apparatus according to claim 1 wherein each of said plurality of branches is provided with a resistance connected in series with the inverse parallel connected pair of thyristors and capacitor of each respective branch.

4. Apparatus according to claim 1 wherein each of said plurality of branches is provided with a series connected capacitor and resistor combination connected in parallel with the inverse parallel connected pair of thyristors of each respective branch.

5. Apparatus according to claim 1 wherein each of said plurality of branches is provided with a resistor connected between one side of the capacitor of each respective branch and a common point.

6. Apparatus according to claim 1 wherein each of said plurality of branches is provided with a resistor connected in parallel with a capacitor of each respective branch.

7. Apparatus according to claim 1 wherein said thyristors of said inverse parallel connected pairs of thyristors are triggered at a large retard angle.

* * * * *